United States Patent [19]

Lomas et al.

[11] Patent Number: 4,483,276

[45] Date of Patent: Nov. 20, 1984

[54] FLUID PARTICLE BACKMIXED COOLING APPARATUS

[75] Inventors: David A. Lomas, Arlington Hts.; Gregory J. Thompson, Waukegan, both of Ill.

[73] Assignee: UOP Inc., Des Plaines, Ill.

[21] Appl. No.: 590,132

[22] Filed: Mar. 16, 1984

Related U.S. Application Data

[60] Division of Ser. No. 412,698, Aug. 30, 1982, Pat. No. 4,439,533, which is a continuation-in-part of Ser. No. 273,296, Jun. 15, 1981, Pat. No. 4,353,812.

[51] Int. Cl.³ .......................... F23C 11/02; F22B 3/02
[52] U.S. Cl. .............................. 122/4 D; 165/104.16; 165/104.18; 165/96; 165/39; 422/146
[58] Field of Search ...................... 165/104.16, 104.18, 165/96, 39; 122/4 D; 422/146, 139, 143, 145

[56] References Cited

U.S. PATENT DOCUMENTS 2,698,171 12/1954 Schoenmakers et al. ........... 422/146
2,715,018 8/1955 Lapple et al. .................. 165/104.16

FOREIGN PATENT DOCUMENTS 16002 2/1979 Japan ................................ 122/4 D
746062 3/1956 United Kingdom ............... 422/146

Primary Examiner—Albert W. Davis, Jr.
Attorney, Agent, or Firm—James R. Hoatson, Jr.; Louis A. Morris; William H. Page, II

[57] ABSTRACT

An apparatus for the cooling of hot fluidized solid particles. The apparatus comprises in combination: (a) a vertically oriented combustion chamber; (b) a disengagement chamber above and connected to the combustion chamber; (c) a collection section at the bottom of the disengagement chamber; (d) a vertically oriented shell and tube heat exchanger with the shell closed at the bottom and the top of the shell in sealed communication with the disengagement chamber such that the particles can circulate to and from the shell and disengagement chamber; (e) a fluidizing gas inlet in the bottom of the shell such that fluidizing gas can enter the shell and continuously backmix the particles; (f) an inlet and outlet to the tubes of the heat exchanger such that a cooling fluid can flow through the tubes; and (g) a control valve in the fluidizing gas inlet with a control system which controls the quantity of cooling fluid removed from the tubes by controlling the amount of fluidizing gas to the heat exchanger which regulates the duty of the heat exchanger.

4 Claims, 1 Drawing Figure

U.S. Patent    Nov. 20, 1984    4,483,276
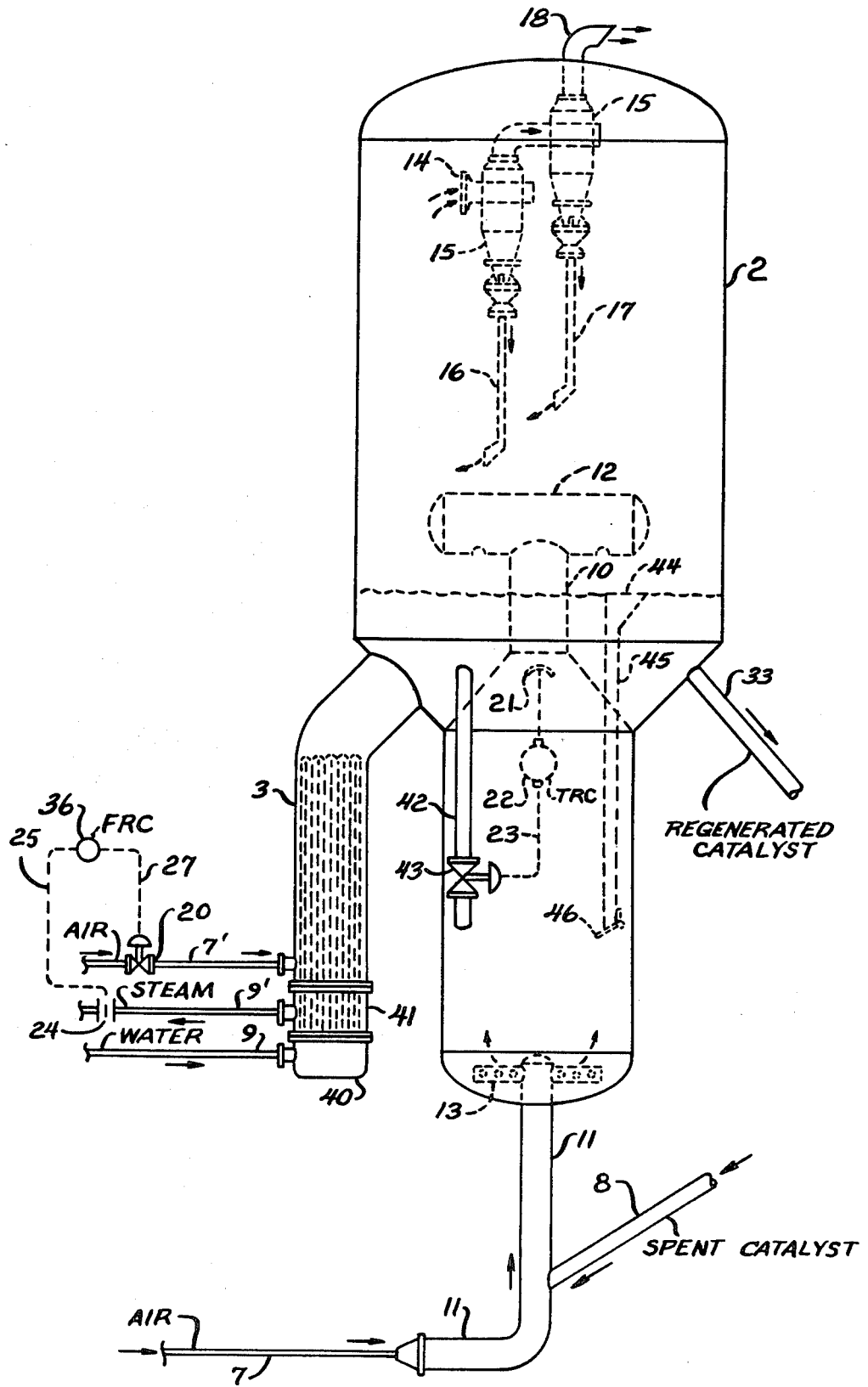

FLUID PARTICLE BACKMIXED COOLING APPARATUS

CROSS REFERENCE TO RELATED APPLICATION

This is a division of application Ser. No. 412,698, filed Aug. 30, 1982, now Pat. No. 4,439,533 which is a continuation-in-part of Ser. No. 273,296, filed June 15, 1981, now U.S. Pat. No. 4,353,812, incorporated herein by reference.

BACKGROUND OF THE INVENTION

The field of art to which this invention pertains is fluid particle cooling. It particularly relates to the combustion of combustible material from a particulated solid such as fluidizable catalyst which has been contaminated by the deposition thereupon of the combustible material, coke. The present invention will be most useful in a process for regenerating coke-contaminated fluid cracking catalyst, but it should find use in any process in which combustible material is burned from solid, fluidizable particles.

DESCRIPTION OF THE PRIOR ART

The fluid catalyst cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke free, catalyst. Regenerators operating at superatmospheric pressures are often fitted with energy-recovery turbines which expand the flue gas as it escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the temperature is by regulating the rate of circulation of catalyst from the regeneration zone to the reaction zone which simultaneously increases the catalyst/ratio. That is to say, if it is desired to increase the conversion rate an increase in the rate of flow of circulating fluid catalyst from the regenerator to the reactor is effected. Inasmuch as the temperature within the regenerator zone under normal operations is considerably higher than the temperature within the reaction zone, this increase in influx of catalyst from the hotter regeneration zone to the cooler reaction zone effects an increase in reaction zone temperature.

Recently, politico-economic restraints which have been put upon the traditional lines of supply of crude oil have made necessary the use, as starting materials in FCC units, of heavier-than-normal oils. FCC units must now cope with feedstocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe about 1400°–1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°–1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

A common prior art method of heat removal provides coolant filled coils within the regenerator, which coils are in contact with the catalyst from which coke is being removed. For example, Medlin et al U.S. Pat. No. 2,819,951, McKinney U.S. Pat. No. 3,990,992 and Vickers U.S. Pat. No. 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesired, because the typical metallurgy of the coils is such that the coils would be damaged by exposure to the high regenerator temperature (up to 1350° F.) without coolant serving to keep them relatively cool. The second zone is also for catalyst disengagement prior to passing the flue gas from the system, and may contain catalyst in dense phase (Medlin et al and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al U.S. Pat. No. 2,596,748; Jahnig et al U.S. Pat. No. 2,515,156; Berger U.S. Pat. No. 2,492,948; and Watson U.S. Pat. No. 2,506,123. At least one of the above U.S. Patents (Harper) discloses that the rate of return of the cooled catalyst to the regenerator may be controlled by the regenerator (dense catalyst phase) temperature.

An important consideration in the above FCC processes involving regenerator heat removal is the method of control of the quantity of heat removed. For example, in Vickers U.S. Pat. No. 4,219,442 the method involves the control of the extent of immersion of cooling coils in a dense phase regenerated catalyst fluidized bed. In Harper U.S. Pat. No. 2,970,117 and Huff U.S. Pat. No. 2,463,623, the sole method involves regulation of the rate of flow of regenerated catalyst through external catalyst coolers. The disadvantages of the first above heat removal method have been previously discussed, i.e. interference of the cooling coils with unit start-up and catalyst disengagement. The above second method of heat removal, utilizing external coolers and varying the rate of catalyst circulation through them as the exclusive means of control of the heat exchanger duty, involves the continual substantial changing of the catalyst loading on the regenerator with the associated difficulty or impossiblity of maintaining convenient steady state operations.

It is known to those skilled in the art of chemical engineering that the heat transfer coefficient of a heat exchange surface varies in relation to the mass velocity across such surface for fluidized systems. See, for example, the article "Fluidized-bed Heat Transfer: A Generalized Dense-phase Correlation"; *A.I.Ch.E. Journal;* December, 1956: Vol. 2, No, 4; ppg. 482–488.

The present invention enables a high degree of flexibility and efficiency of operation of a fluidized particle cooler, particularly when associated with an FCC regenerator, with the cooler remote from the FCC regenerator, but unlike the above prior art FCC processes, the present invention controls the rate of cooling by the heat exchanger in a manner based upon principles involving the relationship between heat transfer coefficients and mass velocity, and not just by varying the flow rate of circulating catalyst.

SUMMARY OF THE INVENTION

Accordingly, the invention is, in one embodiment an apparatus for cooling hot fluidized solid particles which apparatus comprises in combination: (a) a hot particle collection chamber; (b) a shell and tube heat exchanger of vertical orientation, remote from the collection chamber, having the shell closed at the bottom and having the upper portion of the shell of the heat exchanger in sealed communication with the collection chamber such that particles can circulate to and from the collection chamber through the shell; (c) a fluidizing gas inlet conduit connected to a bottom portion of the shell side of the heat exchanger, such that fluidizing gas can pass into the shell side and maintain a continuously backmixed fluidized catalyst bed therein; (d) a control valve placed in the fluidizing gas inlet conduit and a control system comprising means to sense a controlled variable controlled by the duty of the heat exchanger, control means having an adjustable set point connecting with the controlled variable sensing means and developing output signals, and means for transmitting the output signals to the control valve whereby the latter is adjusted responsive to the controlled variable, thereby regulating the flow of fluidizing gas into the heat exchanger and the quantity of particles circulating to and from the collection chamber through the heat exchanger, thereby regulating the heat transfer coefficient between the outside surface of the tubes of the heat exchanger and the fluidized catalyst bed, and thereby regulating the duty; and, (e) inlet and outlet conduits connected to the tubes of the heat exchanger, such that a cooling fluid can flow through the tubes.

Other embodiments of the present invention encompass further details such as the function and arrangement of various components of the apparatus, all of which are hereinafter disclosed in the following discussion of each of these facets of the invention.

BRIEF DESCRIPTION OF THE DRAWING

The FIGURE is a sectional, elevation view of a regeneration apparatus according to one embodiment of the present invention, showing combustion zone 1, disengagement zone 2, and cooling zone (heat exchanger) 3.

The above described drawing is intended to be schematically illustrative of the present invention and not be a limitation thereon.

DETAILED DESCRIPTION OF THE INVENTION

The present invention consist of an apparatus useful for the cooling of a fluidized particulate solid. An important application of the invention will be for a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produced the first dense phase fluidized bed of hot fluidized solid particles cooled by the process of the invention.

The above combustion zone may be in dilute phase with the hot particles transported to a disengaging zone wherein the hot particles are collected and maintained as the first bed, or the combustion zone may be in dense phase and in itself comprise the first bed.

The apparatus of the present invention is particularly useful for the regenerative combustion within a combustion zone of a coke contaminated FCC catalyst from a reaction zone to form hot flue gas and hot regenerated catalyst, disengagement and collection of the hot regenerated catalyst, cooling of the hot regenerated catalyst by backmixing and continuously circulating it through a heat removal or cooling zone, and the use of at least a portion of the cooled regenerated catalyst for control of the temperatures of the combustion zone. As used herein, the term "hot regenerated catalyst" means regenerated catalyst at the temperature leaving the combustion zone, from about 1300° to about 1400° F., while the term "cool regenerated catalyst" means regenerated catalyst at the temperature leaving the cooling zone, the latter of which is about 200° F. less than the temperature of the hot regenerated catalyst. There will be a temperature gradient at the bottom of the disengagement zone, with the coolest catalyst being approximate to the opening to the heat removal zone and the hottest catalyst being at the portion of the bottom of the disengagement zone furthest from such opening.

Reference will now be made to the attached drawing for a discussion of an example of the apparatus of the invention. In the FIGURE regeneration gas, which may be air or another oxygen-containing gas, enters in line 7 and mixes with coke contaminated catalyst entering in conduit 8. These streams are shown as flowing together into mixing conduit 11, although each stream could flow individually into combustion zone 1. The resultant mixture of coke contaminated catalyst and regeneration gas are distributed into the interior of combustion zone 1, at a lower locus thereof, via conduit 11 and distributor 13. Coke contaminated catalyst commonly contains from about 0.1 to about 5 wt. % carbon, as coke. Coke is predominately comprised of carbon, however, it can contain from about 5 to about 15 wt. % hydrogen, as well as sulfur and other materials. The regeneration gas and entrained catalyst flows upward from the lower part of combustion zone 1 to the upper part thereof in dilute phase. The term "dilute phase", as used herein, shall mean a catalyst/gas mixture of less than 30 lbs/ft$^3$, and "dense phase" shall mean such mixture equal to or more than 30 lbs/ft$^3$. Dilute phase conditions, that is, a catalyst/gas mixture of less than 30 lbs/ft$^3$, and typically 2-10 lbs/ft$^3$, are the most efficient for coke oxidation. As the catalyst/gas mixture ascends within combustion zone 1, the heat of combustion of coke is liberated and absorbed by the now relatively carbon-free catalyst, in other words by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst/gas stream upon surface 12 causes almost all of the hot regenerated catalyst flowing from the combustion zone to disengage from the flue gas and fall to the bottom portion of disengagement zone 2 which comprises a hot particle collection chamber or fluid particle collection section. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enters separation means 15 through inlet 14.

These separation means may be cyclone separators, as schematically shown in the FIGURE, or any other effective means for the separation of particulated catalyst from a gas stream. Catalyst separated from the flue gas falls to the bottom of disengagement zone 2 through conduits 16 and 17. The flue gas exits disengagement zone 2 via conduit 18, through which it may proceed to associated energy recovery systems. Having the disengagement zone in upward communication with the combustion zone is advantageous, in comparison to schemes in which the gas/catalyst mixture flows upwards into a relatively dense phase heat removal zone, in that with the former, there is a substantial reduction in the loading of the regenerator cyclones which virtually eliminates large losses of catalyst from FCC units during operational upsets.

With further reference to the FIGURE, heat exchanger 3 is of vertical orientation with the catalyst in the shell side and the heat exchange medium passing through the tubes via lines 9 and 9'. The preferred heat exchanger medium would be water, which would change at least partially from liquid to gas phase (steam) when passing through the tubes. The tube bundle in the heat exchanger will preferably be of the "bayonet" type wherein one end of the bundle is unattached, thereby minimizing problems due to the expansion and contraction of the heat exchanger components when exposed to and cooled from the very high regenerated catalyst temperatures. The heat transfer that occurs is, from the catalyst, through the tube walls and into the heat transfer medium. The bottom of the shell is sealed to catalyst flow and the top of the shell is in sealed communication with the bottom portion of the disengagement zone. The level of the dense phase catalyst bed in the disengagement zone will be kept above the opening into the shell and the catalyst may, thus, freely backmix and circulate throughout the inside of the shell and the bottom of the disengagement zone. Fluidizing gas, preferably air, is passed into a lower portion of the shell side of heat exchanger 3 via line 7', thereby maintaining a dense phase fluidized catalyst bed in the shell side and effecting turbulent backmixing and flow to and from the disengagement zone. Control valve 20 is placed in line 7'. Unlike in the prior art systems, catalyst will not leave the system via the external heat exchanger, thus precluding variable catalyst loading on the regenerator to achieve the cooling function and resultant disruption of steady state operations.

Experiments have determined that sufficient backmixing is attainable within the heat exchanger at reasonable superficial gas velocities to totally dispense with a net catalyst flow requirement. This concept does, however, necessitate increased air requirements (as compared to a system where catalyst flow is a second independent variable available for controlling heat exchanger duty) but eliminates the expensive lower standpipe, expansion joint and slide valve requirements. The air affects the heat transfer coefficient directly by affecting the superficial velocity over the heat exchanger tubes and indirectly by influencing the extent of mass flow of catalyst from the disengagement zone through the heat exchanger. The higher mass flow will result in a higher heat exchanger duty also because the average catalyst temperature in the heat exchanger will be higher thereby providing a higher temperature difference ($\Delta T$) to which the amount of heat transfer is directly proportional.

The FIGURE shows a preferred embodiment of heat exchanger 3 and the manner of the interconnection of heat exchanger 3 with disengagement zone 2. Heat exchanger 3 is shown with the shell side completely filled with a dense phase fluidized catalyst bed which has a level well above the connection between the heat exchanger and disengagement zone. Catalyst freely circulates and backmixes throughout the heat exchanger shell and disengagement zone forming a dense phase continuum. Fluidizing air which enters the shell via line 7' (air may be introduced at one or more points in the shell in addition to that shown) rises upward and flows into the disengagement zone where it ultimately leaves the system with the flue gases.

The tube bundle shown is of the aforementioned bayonet type in which the tubes are attached at the bottom or "head" of the heat exchanger, but not at any other location. A typical configuration of tubes in the bayonet-type bundle would be one inch tubes each ascending from inlet manifold 40 in the head up into the shell through a three inch tube sealed at its top, each one inch tube emptying into the three inch tubes in which it is contained just below the sealed end of the three inch tube. A liquid, such as water, would be passed up into the one inch tubes, would empty into the three inch tubes, would absorbed heat from the hot catalyst through the wall of the three inch tubes as it passed downward through the annular space of the three inch tubes and would exit the heat exchanger, at least partially vaporized, from outlet manifold 41 in the head. It is essential that the quantity of hot particles or catalyst which enter heat exchanger 3 be sufficient to maintain a depth of dense phase fluid catalyst bed which substantially submerges the tubes in the dense phase bed and that, of course, is achieved by the design of the apparatus in accordance with this invention.

It is assumed that the flow of hot catalyst into the disengagement zone will always exceed the hot catalyst exit (via conduit 33) flow requirements and the operation will be set up so that will in fact be the case. At least a portion of catalyst not exiting via conduit 33 will be circulated to the combustion zone. Shown in the FIGURE is external conduit 42 and control valve 43 through which the catalyst may pass to the combustion zone. Also shown is dipleg or standpipe 45 with bottom flapper valve 46 and upper weir 44. Catalyst which does not flow through conduit 42 will overflow weir 44 and fill dipleg 45. When the force exerted by the head of catalyst filling dipleg 45 on flapper valve 46 exceeds that pressure required to open valve 46, i.e. overcome the force exerted by the spring or counterweight holding the valve closed, catalyst will empty from the dipleg into combustion chamber 1. The flapper valve and/or head of catalyst in the dipleg also serve to prevent undesired reversal of flow up the dipleg. The dense phase bed level and thus the catalyst head available to heat exchanger 3 will therefore be held at the level of the lip of weir 44.

One control system contemplated by the present invention for regulating the amount of catalyst flowing through conduit 42 comprises means 21 to sense the temperature in a portion of combustion zone 1, such as the upper portion shown, temperature control means 22 having an adjustable set point connecting with temperature sensing means 21 and developing output signals, and means 23 for transmitting the output signals to control valve 43, whereby the valve may be adjusted responsive to the temperature at the upper portion of combustion zone 1.

The inlet to conduit 42 will be placed in the vicinity of the connection between disengagement zone 2 and heat exchanger 3 and, thus, will receive catalyst from a relatively cool portion of the above discussed temperature gradient, thereby enabling the necessary temperature difference between the combustion zone and circulating catalyst to achieve a cooling effect.

Although the FIGURE illustrates a single heat exchanger with associated circulating catalyst conduit, it should be understood that other configurations are possible, such as two heat exchangers, of the design illustrated, side by side with the conduit 42 between them.

With regard to control of the duty of heat exchanger 3, the preferred mode of operation would be where the controlled variable is the amount of steam generated with such amount controllably maintained by controlling the quantity of fluidizing gas to the catalyst bed in the heat exchanger shell. The quantity of steam generated and flowing through line 9' may be measured by meter 24 which will develop and transmit an output signal via means 25 to flow control means 36. The latter will have an adjustable set point connecting with control valve 20 via means 27. For simplicity, meter 24 is shown as an orifice meter in line 9', but it should be understood that in practice, there will be liquid and gas phases in line 9' which will have to be separated, i.e. via "steam drum", with the steam rate measured downstream of such separation. Flow control means 36, which may incorporate an analogue or digital computer, will have the capability of selecting the optimum amount of fluidizing gas. Such capability may be built or programmed into means 36 for a given system by one skilled in the art and probably be based on empirical relationships derived from the observed operation of the system. The flow of fluidizing gas to the shell side of heat exchanger 3 will thereby be regulated which in turn regulates the mass velocity of the fluidized bed over the outside surfaces of the tubes by affecting the extent of turbulence and mass flow of the bed, which in turn regulates the heat transfer coefficient across such surfaces, and thus the quantity of heat transfer.

The net effect of the preceding mode of operation is that there will be a heat sink available to the combustion system, the magnitude of which may be closely controlled by the simple positioning of a set point. The operation will thereby be made far more flexible or even made possible by the availability of the heat sink that can dispose of heat that might otherwise constitute a process bottleneck. There would, of course, be the additional benefit of a source of a constant quantity of high pressure steam being made available for use wherever needed.

A different mode of operation could be controlling the quantity of the fluidizing gas to the shell side of the heat exchanger to controllably maintain the temperature of the catalyst passed into the combustion zone. The latter temperature is directly affected by the quantity of heat withdrawn from the catalyst in the heat exchanger. For this mode, of course, the quantity of steam generated would vary.

The above preferred heat exchanger duty control scheme provides the ability to remove heat from the FCC regenerator as required to maintain the desired heat sink and at the same time maintain an acceptable degree of stable steady state operation conducive to the controllability and efficiency of the regenerator, all while enjoying flexiblity and ease of operation of an external catalyst cooler or heat exchanger (particularly the ability to not have to utilize cooling during start-up) and the efficiency of catalyst-flue gas separation achieved by a disengagement zone unencumbered by a dense catalyst phase and heat removing paraphernalia.

It should be emphasized, however, that the FCC embodiment illustrated by the FIGURE is only one possible application of the present invention which in its broadest sense is an apparatus for cooling any hot fluidized particles for any purpose.

We claim:

1. Apparatus for cooling hot fluidized solid particles which apparatus comprises in combination:
   (a) a vertically oriented combustion chamber;
   (b) a disengagement chamber located superadjacent to and above said combustion chamber and in communication therewith;
   (c) a fluid particle collection section at the bottom of said disengagement chamber;
   (d) a shell and tube heat exchanger of vertical orientation, remote from said disengagement chamber, having the shell closed at the bottom and having the upper portion of the shell of said heat exchanger in sealed communication with said disengagement chamber such that particles can circulate to and from said disengagement chamber through said shell;
   (e) a fluidizing gas inlet conduit connected to a bottom portion of the shell side of said heat exchanger, such that fluidizing gas can pass into said shell side and maintain a continuously backmixed fluidized particle bed therein;
   (f) inlet and outlet conduits connected to said tubes of said heat exchanger, such that a cooling fluid can flow through said tubes; and
   (g) a control valve placed in said fluidizing gas inlet conduit and a control system comprising means to sense the quantity of said cooling fluid being removed from said tubes which quantity is controlled by the duty of said heat exchanger, control means having an adjustable set point connecting with said sensing means capable of comparing the sensed quantity of said cooling fluid being removed with a predetermined set point to generate a controller output signal, and means for transmitting said output signal to said control valve whereby the latter is adjusted responsive to said quantity of said cooling fluid being removed, thereby regulating the flow of fluidizing gas into said heat exchanger and the quantity of particles circulating to and from said disengagement chamber through said heat exchanger, thereby regulating the heat transfer coefficient between the outside surface of the tubes of said heat exchanger and said fluidized particle bed, and thereby regulating said duty.

2. The apparatus of claim 1 having a particle removal conduit connecting said collection section with a lower portion of said combustion chamber, a portion of said particles flowing through said particle removal conduit to said lower portion of said combustion chamber.

3. The apparatus of claim 2 wherein a particle flow control valve regulates particle flow in said particle removal conduit, there being a control system comprising means to sense a temperature at a desired location in said combustion chamber, temperature control means having an adjustable set point connecting with said temperature sensing means capable of comparing the sensed temperature with a predetermined set point to generate a controller output signal, and means for transmitting said output signal to said particle flow control valve whereby the latter is adjusted responsive to said temperature thereby regulating the flow of particles from said collection section to said combustion chamber.

4. The apparatus of claim 1 wherein a dipleg comprising a conduit of vertical orientation passes from said disengagement chamber to a lower portion of said combustion chamber, the inlet of said dipleg being a weir the lip of which is at the level desired in said particle disengagement chamber, and there being a valve at the outlet of said dipleg which permits the flow of particles only downward through said dipleg, said dipleg thereby serving as a level control means in said disengagement chamber.

* * * * *